United States Patent
Harbaugh et al.

(10) Patent No.: US 9,114,484 B2
(45) Date of Patent: Aug. 25, 2015

(54) WELDING FIXTURE FOR ROBOTIC WELDING SYSTEMS

(71) Applicant: Lincoln Global, Inc., City of Industry, CA (US)

(72) Inventors: Kyle Harbaugh, Moreland Hills, OH (US); Heath Suraba, Avon, OH (US); Don Patton, Mentor on the Lake, OH (US); David Osicki, Painesville, OH (US); Jonathan Tyler Bork, Hudson, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 14/230,412

(22) Filed: Mar. 31, 2014

(65) Prior Publication Data

US 2015/0115017 A1 Apr. 30, 2015

Related U.S. Application Data

(60) Provisional application No. 61/897,453, filed on Oct. 30, 2013.

(51) Int. Cl.
*B23K 37/04* (2006.01)

(52) U.S. Cl.
CPC ......... *B23K 37/0443* (2013.01); *B23K 37/0408* (2013.01); *B23K 37/0435* (2013.01); *B23K 37/0452* (2013.01); *B23K 37/0461* (2013.01)

(58) Field of Classification Search
None
See application file for complete search history.

(56) References Cited

U.S. PATENT DOCUMENTS

| | | | | |
|---|---|---|---|---|
| 2,619,010 A | * | 11/1952 | Mathison | 269/93 |
| 4,054,279 A | * | 10/1977 | Wain | 269/154 |
| 4,679,782 A | * | 7/1987 | Horn et al. | 269/228 |
| 4,708,330 A | * | 11/1987 | Ehl | 269/43 |

(Continued)

FOREIGN PATENT DOCUMENTS

WO 2007/120438 A2 10/2007

OTHER PUBLICATIONS

"New Training System Equips Workforce with Advanced Manufacturing Robotic Skills", online document available at http://newsroom.lincolnelectric.com/News+Releases/lincoln-electric-education-cell-version-2.htm, Lincoln Electric, accessed on Dec. 16, 2013.

(Continued)

*Primary Examiner* — Kiley Stoner
(74) *Attorney, Agent, or Firm* — Pearne & Gordon LLP

(57) ABSTRACT

A welding fixture holds a first workpiece and a second workpiece in a plurality of configurations. The welding fixture includes a fixture base plate, a first toggle clamp configured to apply a clamping force substantially perpendicular to the fixture base plate, a second toggle clamp configured to apply a clamping force substantially parallel to the fixture base plate, and a workpiece support plate. The plurality of configurations for the first workpiece and the second workpiece include at least a horizontal lap configuration in which the first workpiece and the second workpiece are oriented substantially parallel to each other and to the fixture base plate, a vertical lap configuration in which the first workpiece and the second workpiece are oriented substantially parallel to each other and substantially perpendicular to the fixture base plate, and a T configuration in which the first workpiece is oriented substantially perpendicular to the second workpiece.

25 Claims, 4 Drawing Sheets

(56) References Cited

U.S. PATENT DOCUMENTS

| | | | |
|---|---|---|---|
| 4,901,988 A * | 2/1990 | Wright et al. | 269/16 |
| 5,026,033 A * | 6/1991 | Roxy | 269/45 |
| 5,193,790 A * | 3/1993 | Flaten | 269/91 |
| 5,305,992 A * | 4/1994 | Kish | 269/51 |
| 5,346,194 A * | 9/1994 | Coffin, III | 269/166 |
| 5,516,088 A * | 5/1996 | Coffin, III | 269/166 |
| 5,921,535 A * | 7/1999 | Lutz, III | 269/228 |
| 5,924,685 A * | 7/1999 | Webb | 269/228 |
| 5,961,109 A * | 10/1999 | Dykstra et al. | 269/228 |
| 6,629,354 B1 * | 10/2003 | Kline | 29/559 |
| 7,159,629 B1 * | 1/2007 | Rowe | 144/285 |
| 7,238,916 B2 | 7/2007 | Samodell et al. | |
| 7,661,241 B2 * | 2/2010 | Gosis et al. | 52/749.1 |
| 7,753,351 B2 * | 7/2010 | Yajima et al. | 269/152 |
| 8,006,891 B2 | 8/2011 | Osicki | |
| 8,061,018 B2 * | 11/2011 | Stepanek et al. | 29/700 |
| 2002/0020953 A1 * | 2/2002 | Kofod | 269/228 |
| 2007/0108684 A1 * | 5/2007 | Webb | 269/228 |
| 2008/0185761 A1 * | 8/2008 | Jurcinsky et al. | 269/263 |
| 2009/0091072 A1 * | 4/2009 | Wampler, II | 269/85 |
| 2009/0096143 A1 * | 4/2009 | Wampler, II | 269/10 |
| 2009/0100674 A1 * | 4/2009 | Sorenson et al. | 29/869 |
| 2009/0120920 A1 | 5/2009 | Gurney et al. | |
| 2009/0234488 A1 * | 9/2009 | Kilibarda | 700/117 |
| 2009/0273130 A1 * | 11/2009 | Armstrong et al. | 269/16 |
| 2010/0065999 A1 * | 3/2010 | Bereznicki et al. | 269/59 |
| 2010/0148414 A1 * | 6/2010 | Poole et al. | 269/228 |
| 2010/0326983 A1 * | 12/2010 | Sitterlet et al. | 219/635 |
| 2010/0327504 A1 * | 12/2010 | Seidel | 269/43 |
| 2011/0089621 A1 * | 4/2011 | Seidel | 269/46 |
| 2011/0258847 A1 | 10/2011 | Meisho et al. | |
| 2013/0119039 A1 | 5/2013 | Osicki | |
| 2013/0126067 A1 * | 5/2013 | Regan et al. | 156/64 |
| 2013/0207330 A1 * | 8/2013 | Wang et al. | 269/56 |
| 2013/0266503 A1 * | 10/2013 | Baek et al. | 423/448 |
| 2014/0265087 A1 * | 9/2014 | Aguayo et al. | 269/9 |

OTHER PUBLICATIONS

"Swift Arc ML Mobile Learning Robot Cell", online document available at http://esabna.com/us/en/products_catalog.cfm?Product_ID=1357, Esab, accessed on Dec. 16, 2013.

* cited by examiner

WELDING FIXTURE FOR ROBOTIC WELDING SYSTEMS

CROSS-REFERENCE TO RELATED APPLICATIONS

Benefit of U.S. Provisional Patent Application Ser. No. 61/897,453 filed Oct. 30, 2013, is hereby claimed and the disclosure incorporated herein by reference.

BACKGROUND

1. Field of the Disclosure

The present disclosure relates to a workpiece fixture, and in particular to a welding fixture for use in robotic welding cells, such as those described in U.S. Patent Application Publication No. 2013/0119039, published on May 16, 2013, which is incorporated herein by reference.

2. Description of Related Art

Robotic welding continues to grow in popularity due in large part to the critical shortage of skilled labor, combined with the industry's need to remain competitive with lower labor costs and improved productivity. In response to this, robotic welding cells have been developed to help automate the welding process. Accordingly, robotic welding education cells, instructional cells that can be moved from classroom to classroom for training the next generation of welders on robotic programming and welding, have also been developed.

In robotic welding cells, a robotic arm having an arc welding torch is usually located at one end of the cell and welds workpieces positioned within a fixture on a welding table. The robot is programmed to weld along a desired path at the workpiece. Fixtures used to secure workpieces often need to be repositioned or replaced between welds in order to accommodate new workpieces to be welded in various positions. Moreover, the fixtures and/or workpieces need to be positioned properly with respect to the robot, so that the desired weld is performed correctly.

BRIEF SUMMARY

The following summary presents a simplified summary in order to provide a basic understanding of some aspects of the device and systems discussed herein. This summary is not an extensive overview of the devices and systems discussed herein. It is not intended to identify critical elements or to delineate the scope of such devices and systems. Its sole purpose is to present some concepts in a simplified form as a prelude to the more detailed description that is presented later.

In accordance with one aspect, provided is a welding fixture for holding a first workpiece and a second workpiece in a plurality of configurations. The welding fixture includes a fixture base plate and a workpiece support plate. The workpiece support plate includes a first support surface substantially parallel to the fixture base plate, and a second support surface substantially perpendicular to the fixture base plate. A first toggle clamp is configured to apply a clamping force substantially perpendicular to the fixture base plate for clamping both of the first workpiece and the second workpiece between the first toggle clamp and the first support surface such that, in a first configuration, both of the first workpiece and the second workpiece are substantially parallel to the fixture base plate. A second toggle clamp is configured to apply a clamping force substantially parallel to the fixture base plate for clamping both of the first workpiece and the second workpiece between the second toggle clamp and the second support surface such that, in a second configuration, both of the first workpiece and the second workpiece are substantially perpendicular to the fixture base plate. An adjustable clamping plate is selectively positionable along the fixture base plate relative to the workpiece support plate. The adjustable clamping plate is configured for clamping at least one of the first workpiece and the second workpiece between the adjustable clamping plate and the workpiece support plate such that the at least one of the first workpiece and the second workpiece is substantially perpendicular to the fixture base plate.

In accordance with another aspect, provided is a welding fixture for holding a first workpiece and a second workpiece in a plurality of configurations. The welding fixture includes a fixture base plate, a first toggle clamp configured to apply a clamping force substantially perpendicular to the fixture base plate, and a second toggle clamp configured to apply a clamping force substantially parallel to the fixture base plate. A workpiece support plate includes a first support surface substantially parallel to the fixture base plate, and a second support surface substantially perpendicular to the fixture base plate. A mounting plate is located between the fixture base plate and at least one of the first toggle clamp and the second toggle clamp. The mounting plate includes a third support surface substantially parallel to the fixture base plate. The plurality of configurations for the first workpiece and the second workpiece include at least: a first configuration in which the first workpiece and the second workpiece are supported by the first support surface and are substantially parallel to each other and to the fixture base plate; a second configuration in which the first workpiece and the second workpiece are clamped, by the second toggle clamp, between the second toggle clamp and the second support surface such that the first workpiece and the second workpiece are substantially perpendicular to the fixture base plate, and one of the first workpiece and the second workpiece is supported on the third support surface; and a third configuration in which one of the first workpiece and the second workpiece is supported by the first support surface substantially parallel to the fixture base plate, and the other one of the first workpiece and the second workpiece is supported against the second support surface substantially perpendicular to the first workpiece and the fixture base plate.

In accordance with another aspect, provided is a welding fixture for holding a first workpiece and a second workpiece in a plurality of configurations. The welding fixture includes a fixture base plate, a first toggle clamp configured to apply a clamping force substantially perpendicular to the fixture base plate, a second toggle clamp configured to apply a clamping force substantially parallel to the fixture base plate, and a workpiece support plate. The plurality of configurations for the first workpiece and the second workpiece include at least a horizontal lap configuration in which the first workpiece and the second workpiece are oriented substantially parallel to each other and to the fixture base plate, a vertical lap configuration in which the first workpiece and the second workpiece are oriented substantially parallel to each other and substantially perpendicular to the fixture base plate, and a T configuration in which the first workpiece is oriented substantially perpendicular to the second workpiece.

DETAILED DESCRIPTION

Figure 1:
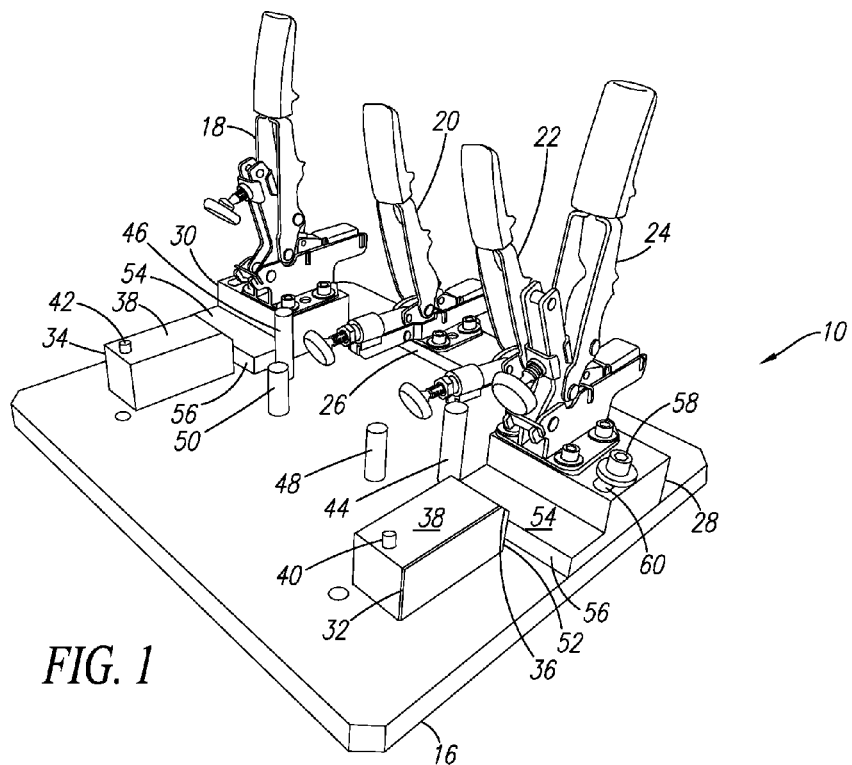
FIG. 1 is a perspective view of a welding fixture.

The present subject matter relates to a workpiece fixture, such as welding fixture for a robotic welding cell. The present subject matter will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present subject matter. It may be evident, however, that the present subject matter can be practiced without these specific details. Additionally, other embodiments of the subject matter are possible and the subject matter is capable of being practiced and carried out in ways other than as described. The terminology and phraseology used in describing the subject matter is employed for the purpose of promoting an understanding of the subject matter and should not be taken as limiting.

Figure 4:
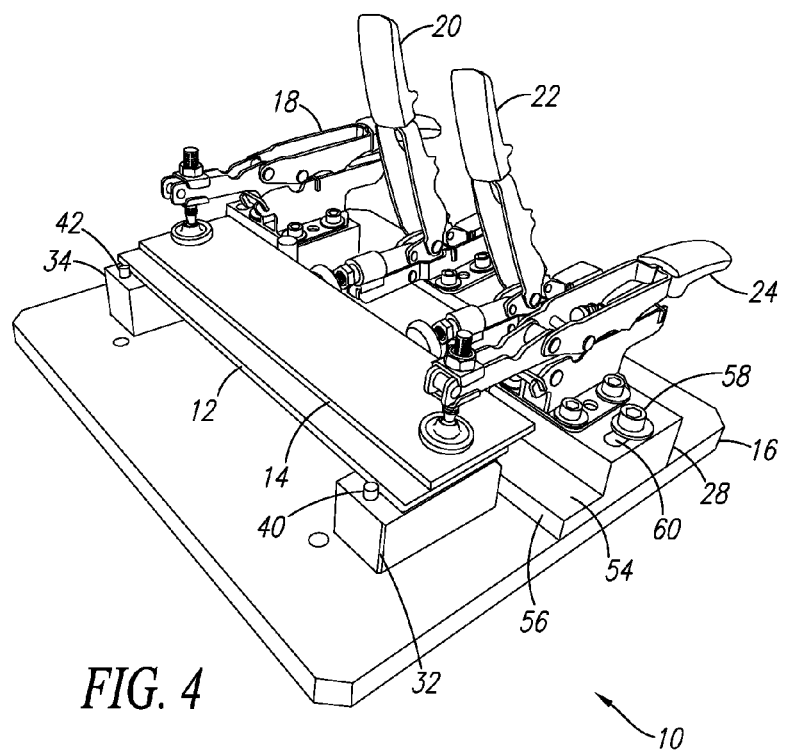
FIG. 4 is a perspective view of the welding fixture and workpieces.
Figure 5:
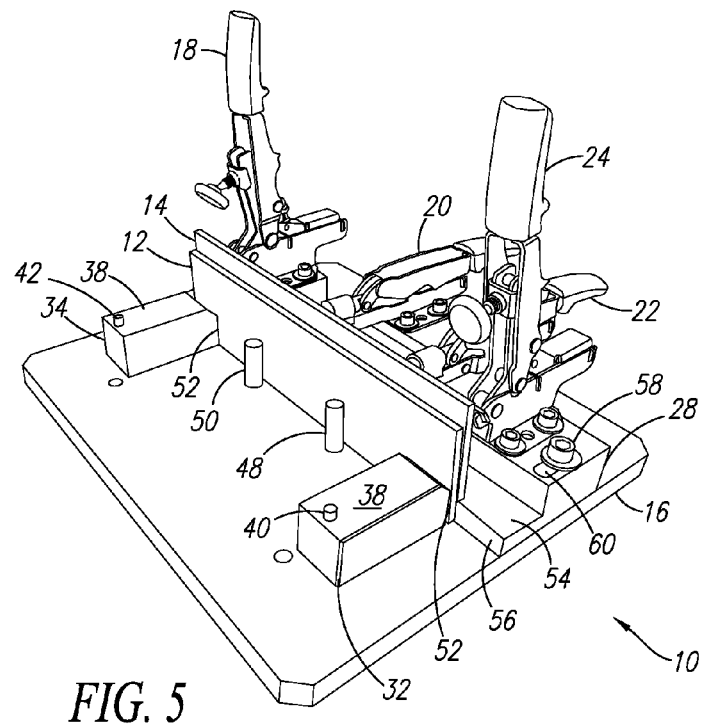
FIG. 5 is a perspective view of the welding fixture and workpieces.
Figure 6:
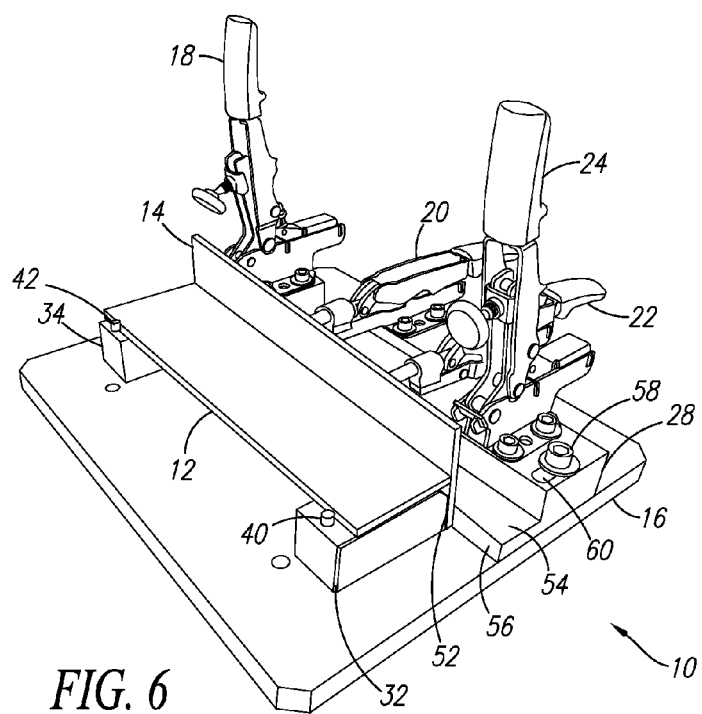
FIG. 6 is a perspective view of the welding fixture and workpieces.

FIGS. 1 and 4-6 provide perspective views of an example welding fixture 10. It can be seen in FIGS. 4-6 that the welding fixture 10 is configured to hold a plurality of workpieces 12, 14 in various different configurations. For example, the welding fixture can hold the workpieces 12, 14 in a flat lap or horizontal lap configuration (FIG. 4), a vertical lap configuration (FIG. 5), and a T configuration (FIG. 6). In the flat lap or horizontal lap configuration, the workpieces 12, 14 are positioned to be joined by a flat lap (1F) weld. In the vertical lap configuration, the workpieces 12, 14 are positioned to be joined by a vertical lap (e.g., 3 o'clock lap) weld. In the T configuration, the workpieces 12, 14 are positioned to be joined by a horizontal fillet (2F) weld. Such welds are industry standard weld joints. Additionally or alternatively, the welding fixture 10 can be configured to hold the workpieces 12, 14 in other configurations, so that the workpieces can be joined by other standard and/or non-standard weld joints. For example, the fixture 10 can be configured to hold the workpieces 12, 14 so that they can be attached by a vertical fillet (3F) weld, overhead fillet (4F) weld, or other weld joints.

The welding fixture 10 can hold the plurality of workpieces 12, 14 in a plurality of different configurations. When used with a welding robot, the position of the welding fixture 10 can be fixed with respect to the robot, such as by bolting or clamping the fixture to a table or frame associated with the robot. With the position of the welding fixture 10 fixed with respect to the robot, the robot can be programmed to correctly perform the various different welds that respectively correspond to the different workpiece configurations accommodated by the fixture 10.

In certain embodiments, the welding robot can be preprogrammed to perform the various different welds, which can be useful in an education welding cell in which students receive instructions on both programming and welding. The fixture 10 can be used to correctly position workpieces with respect to the robot in various different configurations, to teach repeatable and dependable programming and welding.

The workpieces 12, 14 can be plates, such as steel plates between 1 mm and 3 mm thick, for example. The fixture 10 can be configured to hold workpieces 12, 14 of various sizes, depending on the size of the fixture, welding cell, etc. In an educational welding cell, the fixture can be configured to accommodate generally small workpieces, such as 2 inch by 8 inch plates (50.8 mm×203.2 mm) for example. In a manufacturing environment, it can be desirable to configure the fixture to accommodate larger workpieces, such as workpieces several feet in length/width.

The fixture 10 has a fixture base plate 16. It can be seen in FIGS. 4-6 that the workpieces 12, 14 can be held within the fixture 10 either substantially parallel to the fixture base plate 16 or substantially perpendicular to the fixture base plate. That is, the major surfaces of the workpieces 12, 14, as defined by their lengths and widths, can be substantially parallel or substantially perpendicular to the fixture base plate 16. As used herein, when a workpiece 12, 14 is described as being "substantially parallel" to a thing, such as the fixture base plate 16, it means that the major surfaces of the workpiece as defined by its length and width are at least considerably parallel to that thing, regardless of the orientation of the workpiece's edges (as defined by the thickness of the workpiece) with respect to that thing. Similarly, when a workpiece 12, 14 is described as being "substantially perpendicular" to a thing, such as the fixture base plate 16, it means that the major surfaces of the workpiece as defined by its length and width are at least considerably perpendicular to that thing, regardless of the orientation of the workpiece's edges (as defined by the thickness of the workpiece) with respect to that thing. Edges of a workpiece that is "substantially parallel" to the fixture base plate 16 may be perpendicular to the fixture base plate; however the workpiece itself is substantially parallel to the fixture base plate (and not substantially perpendicular to the fixture base plate), even though some or all of its edges are perpendicular to the fixture base plate. Edges of a workpiece that is "substantially perpendicular" to the fixture base plate 16 may be parallel to the fixture base plate; however the workpiece itself is substantially perpendicular to the fixture base plate (and not substantially parallel to the fixture base plate), even though some or all of its edges are perpendicular to the fixture base plate.

With reference to FIGS. 1-6, details of the welding fixture 10 will be described. Components of the welding fixture 10, such as the fixture base plate 16 for example, can be constructed from materials to which welding spatter is unlikely to adhere, or unlikely to adhere strongly. One example material is aluminum, such as 6061-T6 aluminum.

The welding fixture 10 includes a plurality of clamps 18, 20, 22, 24 for holding the workpieces. The clamps 18, 20, 22, 24 can be auto-adjust toggle clamps that automatically adjust to workpieces of varying thickness while maintaining a constant clamping force. The clamping force can be adjustable, such as via an adjustment screw on the toggle clamp. In the example embodiment shown, each clamp is locked in a clamping position when the handle of the clamp is rotated from an upright position to a horizontal position. Thus, the clamps can be considered to be "horizontal" clamps. The outer clamps 18, 24 are configured to apply a downward clamping force substantially perpendicular to the fixture base plate when their handles are in the horizontal clamping position. Thus, the outer clamps 18, 24 can be considered to be horizontal hold-down toggle clamps. The inner clamps 20, 22 are configured to apply a clamping force substantially parallel to the fixture base plate when their handles are in the horizontal clamping position. Thus, the inner clamps 20, 22 can be considered to be horizontal push-pull toggle clamps. It is to be appreciated that clamps 18, 20, 22, 24 can be configured to be locked in the clamping position when their handles are in positions other than horizontal, such as vertical for example. Example toggle clamps for use on the welding fixture 10 include models STC-HH20 and STC-IHH15 manufactured by BESSEY® Tool GmbH & Co. KG of Germany.

In the embodiment shown in the figures, the outer clamps 18, 24 are configured to apply a downward clamping force substantially perpendicular to the fixture base plate, and the inner clamps 20, 22 are configured to apply a clamping force substantially parallel to the fixture base plate. In other embodiments, the outer clamps can be configured to apply a clamping force substantially parallel to the fixture base plate, and the inner clamps can be configured to apply a downward clamping force substantially perpendicular to the fixture base plate. Further, the clamps 18, 20, 22, 24 can be located on various different sides of the fixture base plate 16. For example, the inner clamps 20, 22 could be located on the opposite side of the fixture base plate 16 from the outer camps 18, 24. In the example embodiment shown in the figures, the fixture 10 includes four clamps. However, in other embodiments, the welding fixture 10 can include fewer than four clamps (e.g., two clamps), or more than four clamps.

The clamps 18, 20, 22, 24 could be mounted directly to the fixture base plate 16. However, in the embodiment shown in the figures, the clamps are mounted to mounting plates (e.g., clamp mounting plates) on the fixture base plate 16 located between the clamps and the fixture base plate. The welding fixture 10 includes a common clamp mounting plate 26 for both of the inner clamps 20, 22, and separate clamp mounting plates 28, 30 for the outer clamps 18, 24. The clamps 18, 20, 22, 24 are secured to their respective clamp mounting plates 26, 28, 30, by screws (e.g., set screws), bolts or other appropriate fasteners. The fasteners that secure a clamp to a clamp mounting plate can also secure the clamp mounting plate to the fixture base plate 16, by passing through the clamp mounting plate and into the fixture base plate.

The welding fixture 10 includes two workpiece support plates 32, 34. The workpiece support plates 32, 34 can be generally cuboid in shape, with a chamfered edge 36 facing a clamp/clamp mounting plate as shown. The workpiece support plates 32, 34 have a first support surface 38 that is planar and substantially parallel to the fixture base plate 16. One or both of the workpieces 12, 14 can be supported by the first support surface 38 so that they are held substantially parallel to the fixture base plate 16. FIG. 4 shows both workpieces 12, 14 being supported on the first support surface 38 of the workpiece support plates 32, 34 in a horizontal lap configuration, so that the workpieces 12, 14 are parallel to each other and to the fixture base plate 16. FIG. 6 shows the workpieces in a T configuration, with one workpiece 12 being supported on the first support surface 38 of the workpiece support plates 32, 34 substantially parallel to the fixture base plate 16 and substantially perpendicular to the other workpiece 14.

In the example embodiment shown in the figures, the welding fixture 10 includes two workpiece support plates 32, 34. It is to be appreciated that the welding fixture 10 can include fewer that two workpiece support plates, or more than two workpiece support plates. The workpiece support plates 32, 34 can be attached to the welding fixture 10 by screws or bolts inserted through the bottom of the fixture base plate 16. Alternatively, the workpiece support plates 32, 34 can be formed integrally with the fixture base plate 16.

The workpiece support plates 32, 34 each include a workpiece stop 40, 42 extending from the workpiece support plate above the first support surface 38. The workpiece stops 40, 42 can be dowels that are pressed into holes in the workpiece support plates 32, 34. The function of the workpiece stops 40, 42 is to correctly position one or both of the workpieces 12, 14 on the workpiece support plates 32, 34, for a corresponding welding operation. It can be seen that the workpiece stops 40, 42 engage the edge of a workpiece to position the workpiece on the workpiece support plates 32, 34. The workpiece stops could take the form of a raised edge or curb on the first support surfaces 38, rather than a dowel as shown.

Figure 2:
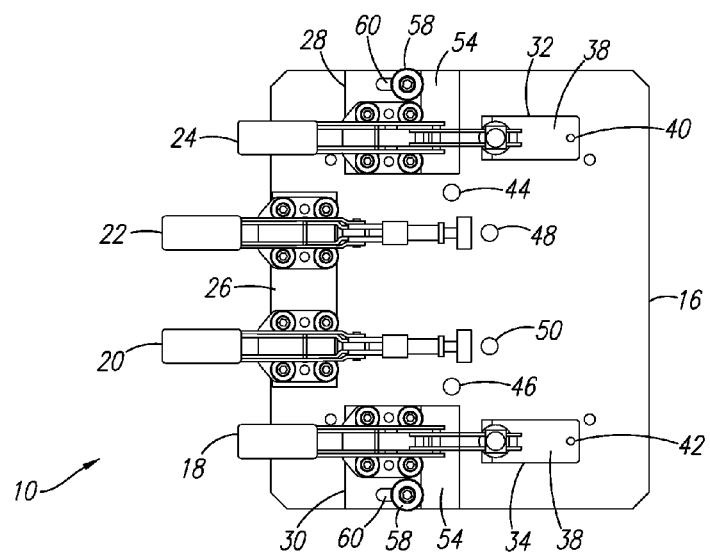
FIG. 2 is a plan view of the welding fixture.
Figure 3:
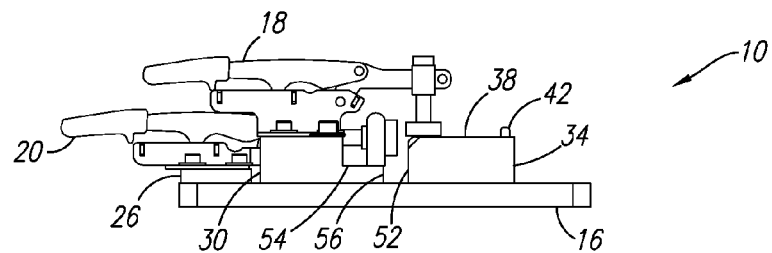
FIG. 3 is a side view of the welding fixture.

As best shown in FIGS. 1 and 2, the welding fixture can include additional workpiece stops 44, 46, such as dowels, that extend from the fixture base plate 16. The additional workpiece stops 44, 46 help to correctly position one workpiece 14 with respect to the other 12 between the workpiece stops when the workpieces are in the horizontal lap configuration (see FIG. 4). The distance between the workpiece stops 40, 42 on the workpiece support plates 32, 34, and the additional workpiece stops 44, 46 that extend from the fixture base plate 16, can allow the workpieces 12, 14 to overlap, with one workpiece offset from the other, so that the workpieces can be joined by a flat lap weld.

In an embodiment, the welding fixture 10 can include anti-deformation members 48, 50, such as dowels, a curb etc. The anti-deformation members 48, 50 serve limit the amount of bend of a vertically-held workpiece due to the force applied to the workpiece by the inner clamps 20, 22. The function of the anti-deformation members 48, 50 is illustrated in FIG. 5. Here, the workpieces 12, 14 are clamped against the workpiece support plates 32, 34 by the inner clamps 20, 22, and the anti-deformation members 48, 50 limit the amount of deflection of the central portions of the workpieces 12, 14 due to the inner clamps 20, 22.

As discussed above, the workpiece support plates 32, 34 have a first support surface 38. The workpiece support plates 32, 34 also have a second support surface 52 that faces the clamp mounting plates 28, 30 for the outer clamps 18, 24. The second support surface 52 is planar and substantially perpendicular to the fixture base plate and to the first support surface 38. One or both of the workpieces 12, 14 can be clamped against the second support surface 52 using the inner push-pull clamps 20, 22 (see FIGS. 5 and 6). The inner push-pull clamps 20, 22 can clamp one or both of the workpieces 12, 14 between the clamps and the second support surface 52 such that the workpiece(s) 12, 14 are held in a vertical position substantially perpendicular to the fixture base plate 16.

The clamp mounting plates 28, 30 for the outer clamps 18, 24 have a stepped portion that forms a third support surface 54 for supporting a workpiece 14 (FIG. 5). The third support surface 54 is planar and substantially parallel to the fixture base plate 16, and is located at a higher elevation than the fixture base plate, but at a lower elevation than the first support surface 38. The third support surface 54 provides a step so that one workpiece 14 can be vertically offset from the other 12, and supported above the fixture base plate 16, to provide the vertical lap configuration. It can be seen in FIG. 5 that one workpiece 12 rests on the fixture base plate 16, and the other workpiece 14 rests on the third support surface 54 when the workpieces are in the vertical lap configuration.

The front surfaces of the clamp mounting plates 28, 30 for the outer clamps 18, 24 each provide a fourth support surface 56, which is planar and substantially perpendicular to the fixture base plate 16. Moreover, the clamp mounting plates 28, 30 for the outer clamps 18, 24 can provide adjustable clamping plates that can be selectively positioned along the fixture base plate 16 relative to the workpiece support plates 32, 34. For example, the clamp mounting plates 28, 30 for the outer clamps 18, 24 can include a set screw 58 mounted within a slot 60, which allows the clamp mounting plates to be selectively positioned along the fixture base plate 16 relative to the workpiece support plates 32, 34. The clamp mounting plates 28, 30 and the outer clamps 18, 24 are aligned with the workpiece support plates 32, 34. The clamp mounting plates 28, 30 can be slid toward or away from the workpiece support plates 32, 34, and then held in position by tightening the set screw 58. Workpieces can be held vertically, or perpendicular to the fixture base plate 16, between the second support surface 52 and the fourth support surface 56 until securely clamped against the second support surface 52 by the inner push-pull clamps 20, 22. Thus, the clamp mounting plates 28, 30 for the outer clamps 18, 24 can function as adjustable clamping plates for temporarily clamping a workpiece between the second support surface 52 and the fourth support surface 56. Additionally or alternatively, the positions of the workpiece support plates 32, 34 can be adjusted in manner similar to the clamp mounting plates 28, 30. However, adjusting the positions of the workpiece support plates 32, 34 will change the location of the workpieces 12, 14, which could require a modification to a programmed welding operation of an associated welding robot, so that the welding operation is performed correctly.

FIG. 4 shows the workpieces 12, 14 held in the welding fixture 10 in the flat lap or horizontal lap configuration. Both workpieces 12, 14 are clamped between the outer toggle clamps 18, 24 and the first support surface 38 of the workpiece support plates 32, 34. The flat lap (1F) weld 62 can be seen in FIG. 4.

FIG. 5 shows the workpieces 12, 14 held in the welding fixture 10 in the vertical lap configuration. One workpiece 12 is clamped between the second support surface 52 of the workpiece support plates 32, 34 and the fourth support surface 56 of the outer clamp mounting plates 28, 30. The other workpiece 14 is supported above the fixture base plate 16 on the third support surface 54 of the outer clamp mounting plates 28, 30. Both workpieces 12, 14 are clamped between the inner push-pull clamps 20, 22 and the second support surface 52 by the inner push-pull clamps. The vertical lap (e.g., 3 o'clock lap) weld 64 can be seen in FIG. 5.

FIG. 6 shows the workpieces 12, 14 held in the welding fixture 10 in the T configuration. One workpiece 12 is supported by the first support surface 38 of the workpiece support plates 32, 34 substantially parallel to the fixture base plate 16 and perpendicular to the other workpiece 14. The other workpiece 14 is clamped against the second support surface 52, between the second support surface and the fourth support surface 56, and between the inner push-pull clamps 20, 22 and the second support surface 52, by the inner push-pull clamps. The horizontal fillet weld 66 can be seen in FIG. 6.

Figure 7:
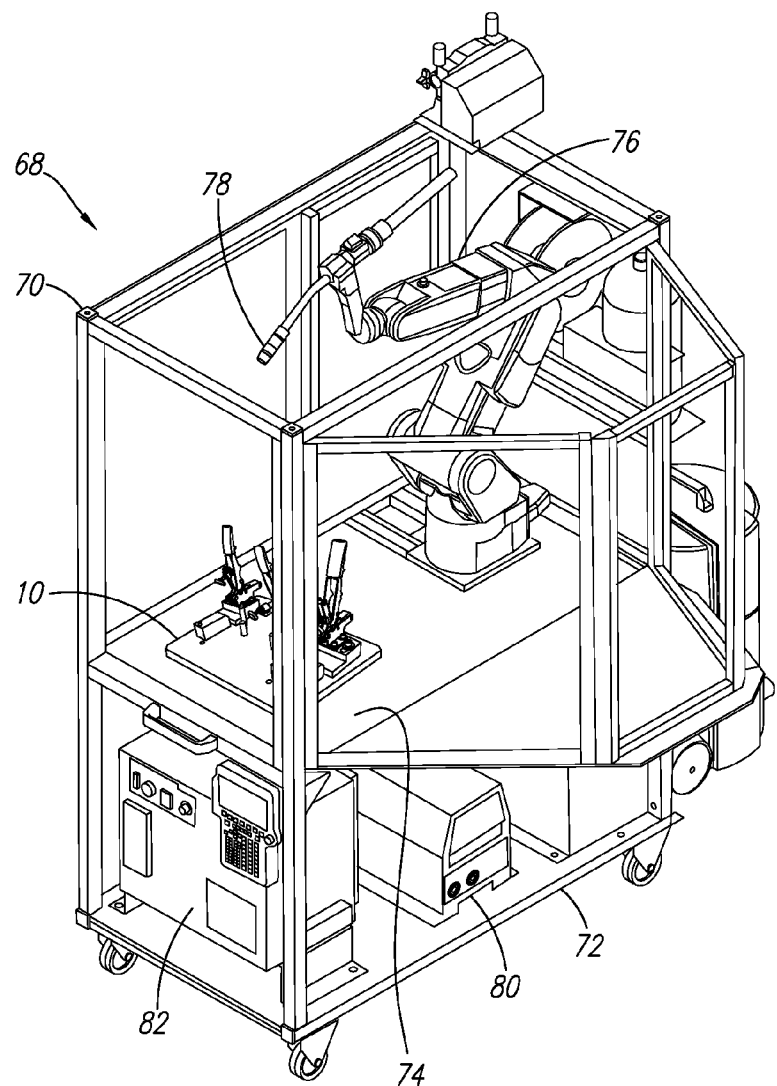
FIG. 7 is a perspective view of a welding cell.

A welding cell 68 is shown in FIG. 7. The welding cell 68 includes a cell enclosure 70 mounted on a cart 72, so that the welding cell can be readily moved. The welding cell 68 includes a cell table 74 to which the welding fixture 10 is attached. For example, the welding fixture 10 can be bolted to the cell table 74. A welding robot 76 with an arc welding torch or gun 78 is mounted within the welding cell 68. A welding power supply 80 is located on the cart 72 and is operatively connected to the welding torch 78 to perform a welding operation. Example welding operations include gas metal arc welding (GMAW), flux-cored arc welding (FCAW), etc. A robot controller 82 is also located on the cart 72 and is operatively connected to the welding robot 76 to control its movements during a welding operation. Workpieces can be secured within the welding fixture 10, and the welding robot 76 can be programmed to perform welding operations on the workpieces, such as a flat lap weld, a vertical lap weld or a horizontal fillet weld as described above.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding fixture for holding a first workpiece and a second workpiece in a plurality of configurations, comprising:
   a fixture base plate;
   a workpiece support plate comprising a first support surface substantially parallel to the fixture base plate, and a second support surface substantially perpendicular to the fixture base plate;
   a first toggle clamp configured to apply a clamping force substantially perpendicular to the fixture base plate for clamping both of the first workpiece and the second workpiece between the first toggle clamp and the first support surface such that, in a first configuration, both of the first workpiece and the second workpiece are substantially parallel to the fixture base plate;
   a second toggle clamp configured to apply a clamping force substantially parallel to the fixture base plate for clamping both of the first workpiece and the second workpiece between the second toggle clamp and the second support surface such that, in a second configuration, both of the first workpiece and the second workpiece are substantially perpendicular to the fixture base plate; and
   an adjustable clamping plate that is selectively positionable along the fixture base plate relative to the workpiece support plate, wherein the adjustable clamping plate is configured for clamping at least one of the first workpiece and the second workpiece between the adjustable clamping plate and the workpiece support plate such that the at least one of the first workpiece and the second workpiece is substantially perpendicular to the fixture base plate.

2. The welding fixture of claim 1, wherein the adjustable clamping plate is a clamp mounting plate mounting at least one of the first toggle clamp and the second toggle clamp to the fixture base plate.

3. The welding fixture of claim 2, wherein:
   the adjustable clamping plate comprises a third support surface substantially parallel to the fixture base plate, and a fourth support surface substantially perpendicular to the fixture base plate,
   the first configuration is a horizontal lap configuration, and
   the second configuration is a vertical lap configuration in which one of the first workpiece and the second workpiece is clamped between the second support surface and the fourth support surface, and the other one of the first workpiece and the second workpiece is supported above the fixture base plate on the third support surface.

4. The welding fixture of claim 3, wherein the first support surface is located at a higher elevation above the fixture base plate than the third support surface.

5. The welding fixture of claim 3, wherein the plurality of configurations includes a T configuration in which one of the first workpiece and the second workpiece is supported by the first support surface substantially perpendicular to the other one of the first workpiece and the second workpiece, and the other one of the first workpiece and the second workpiece is clamped between the second support surface and the fourth support surface.

6. A welding cell, comprising:
   the welding fixture of claim 5;

a cell table to which the welding fixture is attached; and
a welding robot configured to perform:
- a flat lap weld with the first workpiece and the second workpiece in the horizontal lap configuration,
- a vertical lap weld with the first workpiece and the second workpiece in the vertical lap configuration, and
- a horizontal fillet weld with the first workpiece and the second workpiece in the T configuration.

7. The welding fixture of claim 1, further comprising a third toggle clamp configured to apply a clamping force substantially perpendicular to the fixture base plate, and a fourth toggle clamp configured to apply a clamping force substantially parallel to the fixture base plate, wherein the toggle clamps are automatically adjusting toggle clamps.

8. The welding fixture of claim 7, wherein the workpiece support plate is a first workpiece support plate, and the adjustable clamping plate is a first clamp mounting plate mounting the first toggle clamp to the fixture base plate, the welding fixture further comprising:
a second clamp mounting plate mounting the third toggle clamp to the fixture base plate; and
a second workpiece support plate, wherein:
the second clamp mounting plate is positionable along the fixture base plate relative to the second workpiece support plate,
the first toggle clamp is aligned with the first workpiece support plate, and
the third toggle clamp is aligned with the second workpiece support plate.

9. The welding fixture of claim 8, further comprising a workpiece stop extending from the first workpiece support plate above the first support surface, and another workpiece stop extending from the fixture base plate, wherein the first configuration is a horizontal lap configuration in which the first workpiece and the second workpiece are located between the workpiece stops.

10. A welding fixture for holding a first workpiece and a second workpiece in a plurality of configurations, comprising:
a fixture base plate;
a first toggle clamp configured to apply a clamping force substantially perpendicular to the fixture base plate;
a second toggle clamp configured to apply a clamping force substantially parallel to the fixture base plate;
a workpiece support plate comprising a first support surface substantially parallel to the fixture base plate, and a second support surface substantially perpendicular to the fixture base plate; and
a mounting plate located between the fixture base plate and at least one of the first toggle clamp and the second toggle clamp, the mounting plate comprising a third support surface substantially parallel to the fixture base plate,
wherein the plurality of configurations for the first workpiece and the second workpiece include at least:
a first configuration in which the first workpiece and the second workpiece are supported by the first support surface and are substantially parallel to each other and to the fixture base plate;
a second configuration in which the first workpiece and the second workpiece are clamped, by the second toggle clamp, between the second toggle clamp and the second support surface such that the first workpiece and the second workpiece are substantially perpendicular to the fixture base plate, and one of the first workpiece and the second workpiece is supported on the third support surface; and
a third configuration in which one of the first workpiece and the second workpiece is supported by the first support surface substantially parallel to the fixture base plate, and the other one of the first workpiece and the second workpiece is supported against the second support surface substantially perpendicular to the first workpiece and the fixture base plate.

11. The welding fixture of claim 10, wherein the mounting plate is a clamp mounting plate mounting at least one of the first toggle clamp and the second toggle clamp to the fixture base plate.

12. The welding fixture of claim 11, wherein the clamp mounting plate is selectively positionable along the fixture base plate relative to the workpiece support plate, the clamp mounting plate comprising a fourth support surface substantially perpendicular to the fixture base plate, wherein the clamp mounting plate is configured for clamping at least one of the first workpiece and the second workpiece between the second support surface and the fourth support surface.

13. The welding fixture of claim 10, wherein the first support surface is located at a higher elevation above the fixture base plate than the third support surface.

14. The welding fixture of claim 10, further comprising a third toggle clamp configured to apply a clamping force substantially perpendicular to the fixture base plate, and a fourth toggle clamp configured to apply a clamping force substantially parallel to the fixture base plate, wherein the toggle clamps are automatically adjusting toggle clamps.

15. The welding fixture of claim 14, wherein the workpiece support plate is a first workpiece support plate, and the mounting plate is a first clamp mounting plate mounting the first toggle clamp to the fixture base plate, the welding fixture further comprising:
a second clamp mounting plate mounting the third toggle clamp to the fixture base plate; and
a second workpiece support plate, wherein:
the first clamp mounting plate is selectively positionable along the fixture base plate relative to the first workpiece support plate,
the second clamp mounting plate is selectively positionable along the fixture base plate relative to the second workpiece support plate,
the first toggle clamp is aligned with the first workpiece support plate, and
the third toggle clamp is aligned with the second workpiece support plate.

16. The welding fixture of claim 15, further comprising a workpiece stop extending from the first workpiece support plate above the first support surface, and another workpiece stop extending from the fixture base plate, wherein the first configuration is a horizontal lap configuration in which the first workpiece and the second workpiece are located between the workpiece stops.

17. A welding cell, comprising:
the welding fixture of claim 10;
a cell table to which the welding fixture is attached; and
a welding robot configured to perform:
a flat lap weld with the first workpiece and the second workpiece in the first configuration,
a vertical lap weld with the first workpiece and the second workpiece in the second configuration, and
a horizontal fillet weld with the first workpiece and the second workpiece in the third configuration.

18. A welding fixture for holding a first workpiece and a second workpiece in a plurality of configurations, comprising:
- a fixture base plate;
- a first toggle clamp configured to apply a clamping force substantially perpendicular to the fixture base plate;
- a second toggle clamp configured to apply a clamping force substantially parallel to the fixture base plate; and
- a workpiece support plate,
- wherein the plurality of configurations for the first workpiece and the second workpiece include at least a horizontal lap configuration in which the first workpiece and the second workpiece are oriented substantially parallel to each other and to the fixture base plate, a vertical lap configuration in which the first workpiece and the second workpiece are oriented substantially parallel to each other and substantially perpendicular to the fixture base plate, and a T configuration in which the first workpiece is oriented substantially perpendicular to the second workpiece.

19. The welding fixture of claim 18, wherein:
- the workpiece support plate comprises a first support surface and a second support surface substantially perpendicular to the first surface,
- in the horizontal lap configuration, the first toggle clamp clamps both of the first workpiece and the second workpiece between the first toggle clamp and the first support surface,
- in the vertical lap configuration, the second toggle clamp clamps the first workpiece and the second workpiece between the second toggle clamp and the second support surface, and
- in the T configuration, the first workpiece is supported by the first support surface, and the second toggle clamp clamps the second workpiece against the second support surface.

20. The welding fixture of claim 19, further comprising a selectively positionable clamp mounting plate mounting one of the first toggle clamp and the second toggle clamp to the fixture base plate, wherein the clamp mounting plate is selectively positionable along the fixture base plate, the clamp mounting plate comprising a third support surface substantially parallel to the fixture base plate and a fourth support surface substantially perpendicular to the fixture base plate, wherein:
- in the vertical lap configuration, the second workpiece is supported above the fixture base plate by the third support surface, and
- in the T configuration, the first workpiece is supported by the first support surface, and the second workpiece is clamped against the second support surface and between the second support surface and the fourth support surface.

21. The welding fixture of claim 18, further comprising a third toggle clamp configured to apply a clamping force substantially perpendicular to the fixture base plate, and a fourth toggle clamp configured to apply a clamping force substantially parallel to the fixture base plate, wherein the toggle clamps are automatically adjusting toggle clamps.

22. The welding fixture of claim 21, further comprising a first selectively positionable clamp mounting plate mounting the first toggle clamp to the fixture base plate, and a second selectively positionable clamp mounting plate mounting the third toggle clamp to the fixture base plate.

23. The welding fixture of claim 22, wherein the workpiece support plate is aligned with the first selectively positionable clamp mounting plate, the welding fixture further comprising a second workpiece support plate aligned with the second selectively positionable clamp mounting plate.

24. The welding fixture of claim 18, further comprising a first workpiece stop extending from the workpiece support plate above a first support surface of the workpiece support plate, and a second workpiece stop extending from the fixture base plate, wherein, in the horizontal lap configuration, the first workpiece and the second workpiece are located between the workpiece stops.

25. A welding cell, comprising:
- the welding fixture of claim 18;
- a cell table to which the welding fixture is attached; and
- a welding robot configured to perform:
  - a flat lap weld with the first workpiece and the second workpiece in the horizontal lap configuration,
  - a vertical lap weld with the first workpiece and the second workpiece in the vertical lap configuration, and
  - a horizontal fillet weld with the first workpiece and the second workpiece in the T configuration.

* * * * *